Nov. 14, 1950     C. F. MITTMAN     2,529,882
HOP STRAINER

Filed Dec. 6, 1946     3 Sheets-Sheet 1

Nov. 14, 1950 — C. F. MITTMAN — 2,529,882
HOP STRAINER
Filed Dec. 6, 1946 — 3 Sheets-Sheet 2

Nov. 14, 1950     C. F. MITTMAN     2,529,882
HOP STRAINER
Filed Dec. 6, 1946     3 Sheets-Sheet 3
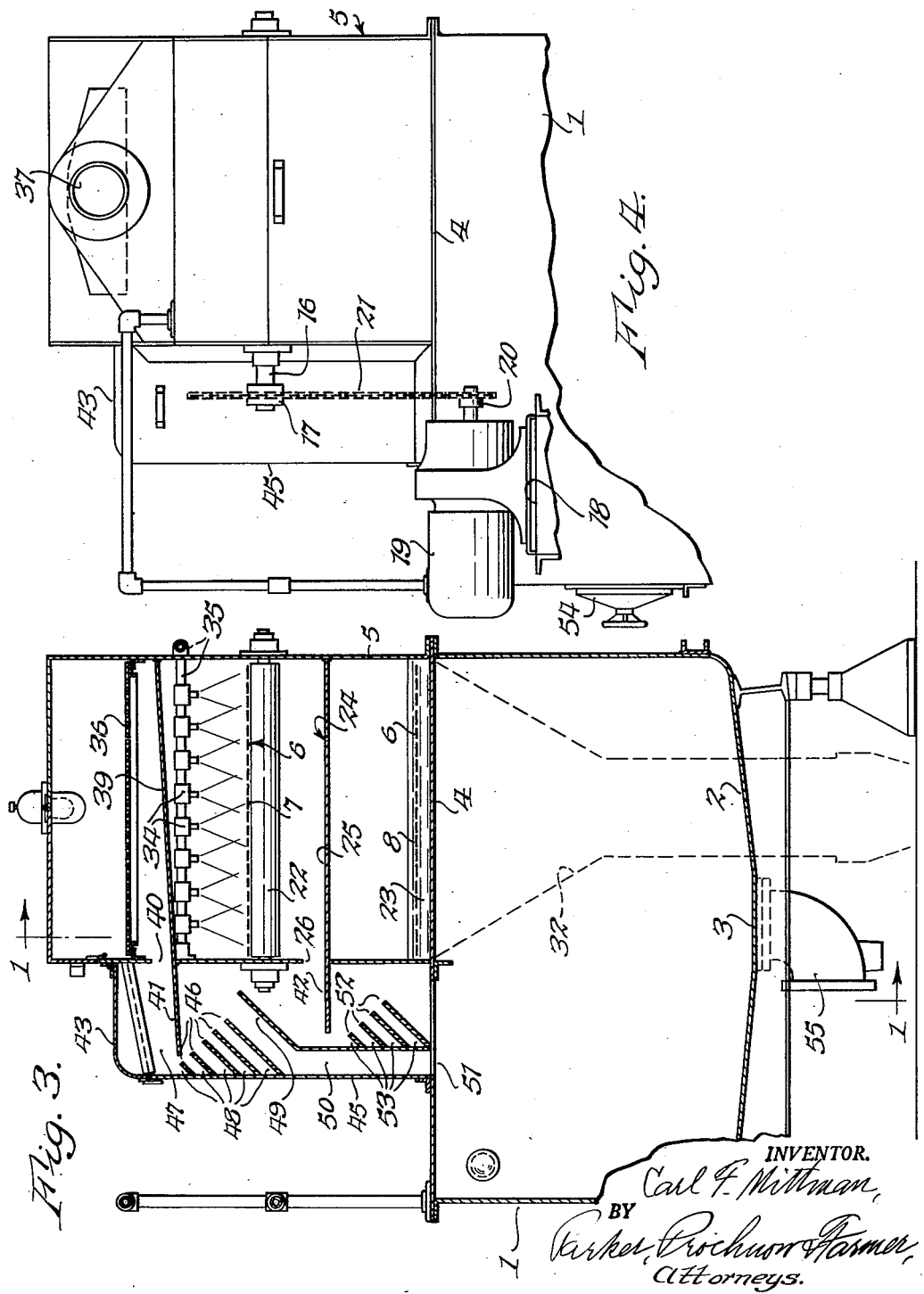
INVENTOR.
Carl F. Mittman,
BY
Parker, Prochnow Farmer,
Attorneys.

Patented Nov. 14, 1950

2,529,882

UNITED STATES PATENT OFFICE 2,529,882

HOP STRAINER

Carl F. Mittman, Buffalo, N. Y.

Application December 6, 1946, Serial No. 714,439

14 Claims. (Cl. 210—198)

This invention relates to strainers, clarifiers and filters, and more particularly to a combined hop strainer and trub clarifier or separator for use in the brewing industry.

An object of this invention is to provide an improved strainer, clarifier and separator with which the cooked hops and wort may be separated continuously, completely and rapidly; with which a major amount of the trub, that is, the fine solids of the cooked hops and wort mixture, will be effectively separated from the wort; with which no sugar coating on the separating surface can take place; with which the separating surfaces will be automatically cleaned; with which all parts of the apparatus will be easily accessible for cleaning and collection of stale wort is prevented; which will have maximum capacity with minimum overall dimensions and low cost of operation; and which will be relatively simple, compact, efficient, practical and inexpensive.

Another object of the invention is to provide an improved simple, inexpensive and continuous method of separating cooked hops and wort; with which maximum recovery of the wort is possible; and which will require only relatively simple apparatus.

Another object is to provide an improved method and apparatus for continuously separating cooked hops from wort; with which the separation will occur upon a clean and sterile screen; with which the screen will be conditioned continuously and automatically during use.

A further object is to provide an improved apparatus for continuously separating cooked hops from wort which may operate for periods of considerable duration without clogging of the screen, and with which the separation effecting means may be kept clean and sterile throughout the operation.

Other objects and advantages will be apparent from the following description of an embodiment of the invention, and the novel features will be particularly pointed out hereinafter in connection with the appended claims.

In the accompanying drawing:

Fig. 3 is a transverse, sectional elevation of the same, the section being taken approximately along the line 3—3 of Fig. 1; and Fig. 4 is an end elevation of part of the same, and illustrates certain details of construction.

Figure 1:
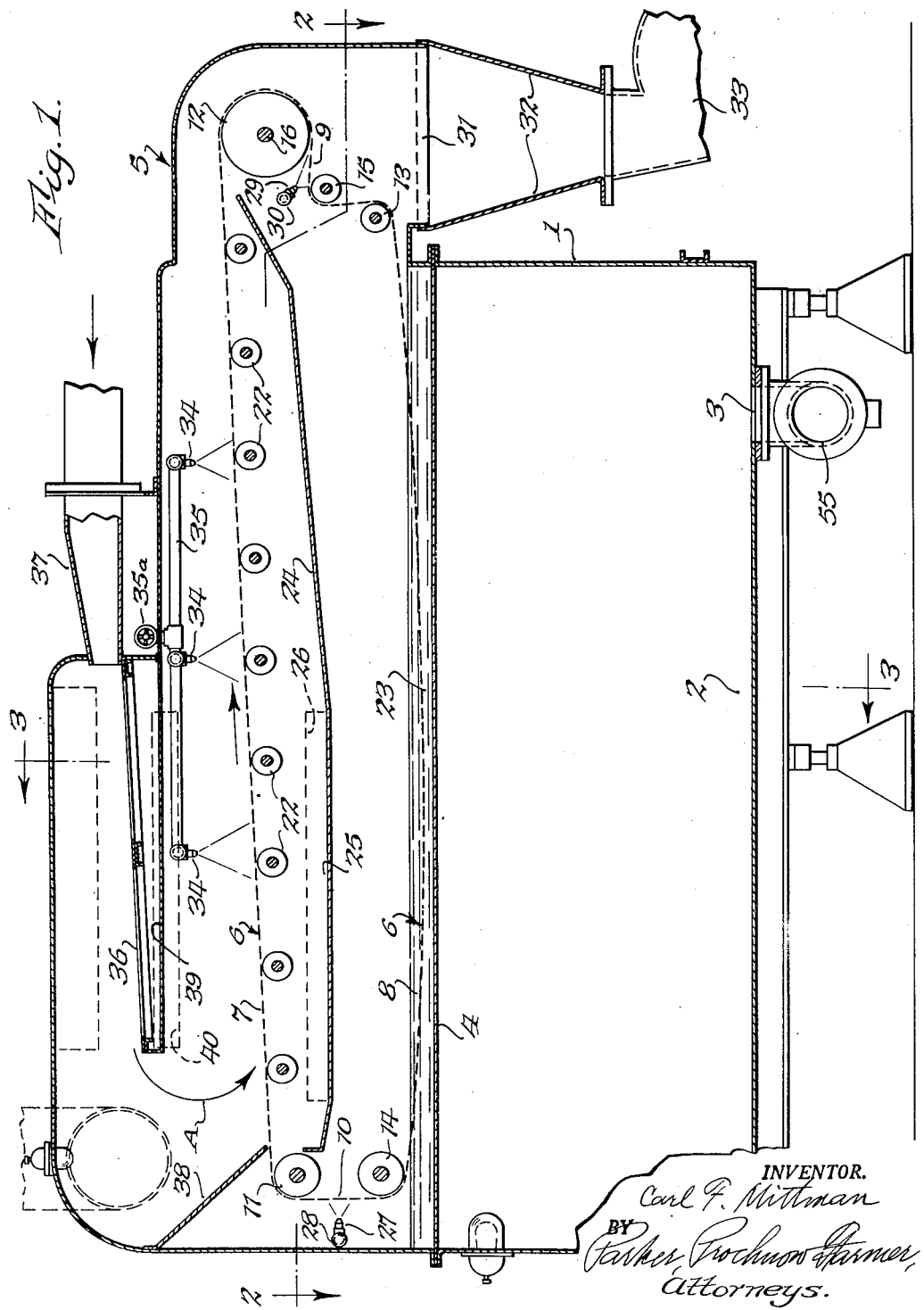
Fig. 1 is a longitudinal, sectional elevation through a strainer and filter constructed in accordance with this invention, the section being taken approximately along the line 1—1 of Fig. 3.

In the illustrated embodiment of the invention, the improved strainer and separator, which is intended particularly for separating the cooked hops and trub from the wort, includes a receiving tank 1 having a sloping bottom 2 leading to an outlet 3, and normally closed at its top by a plate 4. On one part of the plate 4 is supported a housing 5, the bottom of which is formed by the plate 4. Disposed in the housing 5 is an endless belt 6 (Fig. 1) having an upper stretch 7, a lower stretch 8, and end sections 9 and 10 which connect the corresponding or adjacent ends of the upper and lower stretches. The upper belt stretch runs between an idler roller 11 and a driving roller 12, which are disposed adjacent opposite ends of the housing 5, and the lower stretch runs between idler rollers 13 and 14 which are also disposed at opposite ends of the housing 5.

The roller 14 is disposed adjacent and below the roller 11 at one end of the housing 5, but the roller 13 is spaced horizontally away from the driving roller 12 a short distance. Another idler roller 15 is disposed between the rollers 12 and 13, so that the end section 9 of the belt, after passing around the driving roller 12 for about half a revolution, will pass over the idler roller 15 and then descend approximately vertically to the roller 13. The driving roller 12 is fixed on a driving shaft 16 (see Figs. 1 and 4) which extends outside of the housing shown in Fig. 4 and carries a sprocket wheel or pulley 17 by which it may be driven.

Figure 2:
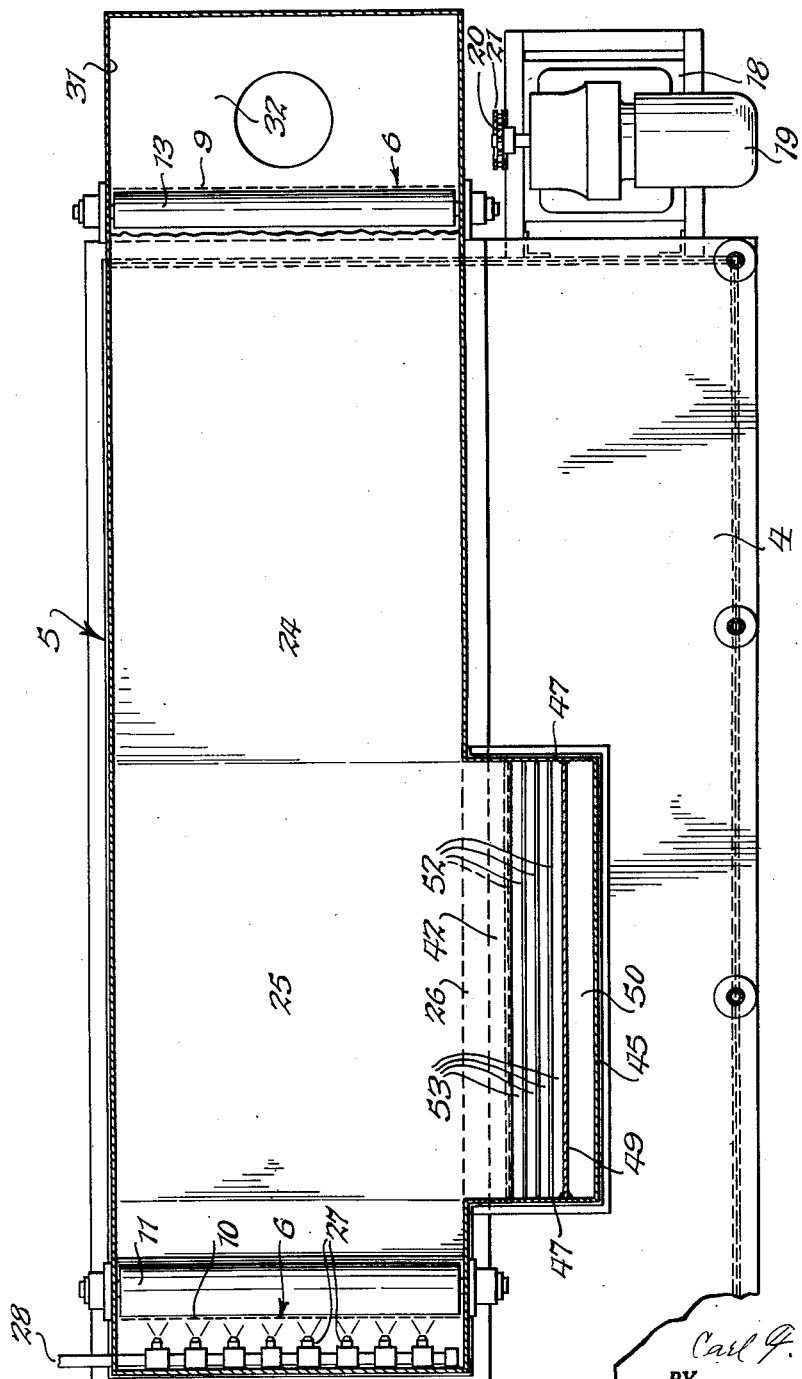
Fig. 2 is a sectional plan of the same, the section being taken approximately along the line 2—2 of Fig. 1.

Disposed on a platform 18 (Figs. 2 and 4) adjacent one end of the tank 1 is an electric motor 19 (Fig. 4) which operates a driving pulley or sprocket pinion 20 which, in turn, is connected by a flexible belt or driving chain 21 to the sprocket wheel or pulley 17. The motor preferably has included as a part thereof a speed reduction mechanism, so that pinion 20 operates at about 45 R. P. M. although the actual speed of the motor itself may be larger. The pulley 20 is much smaller in diameter than the gear 17 which provides a much further reduction in the speed at which the shaft 16 will be rotated. Thus with a suitable driving connection between the motor and the shaft 16, the driving roller 12 may be given the desired driving speed which will impart, in turn, the desired linear travel speed of the belt 6. The belt has a surface formed of small sieve-like passages therethrough for retaining the hop solids thereon, but passing the wort, as will be explained hereinafter.

While any suitable, endless, flexible belt which will function as a strainer or sieve may be employed, I have found that a specially woven, bronze-wire, duplex belt is very satisfactory for this purpose. The mesh of the woven belt is such as to pass the wort or liquid but retain on the surface thereof the solid parts of the hops. The upper stretch 7 of this belt is supported along its travel at intervals by a plurality of small idler rollers 22, disposed beneath this stretch, but the lower stretch between the rollers 13 and 14 is preferably unsupported, so that it may sag into a shallow, upwardly opening pan 23 which forms the bottom of the housing 5. This pan 23 contains hot water, and the belt, in running through it, will be immersed therein during its travel which aids in dislodging any part of the hop solids which may adhere thereto as will be explained more fully hereinafter.

Disposed beneath the upper stretch 7 of the belt for substantially the full distance between the rollers 11 and 12 is a collecting member 24 which is somewhat pan-shaped and serves to collect all liquid passing through the belt in the upward stretch. This member 24 has an inclined or sloping body that conducts the wort to an intermediate area 25 where it is discharged at one side of the housing 5 through an opening 26, see Fig. 3.

Disposed at one end of the housing 5 are a plurality of nozzles 27 (see Fig. 1) which are supplied with steam through a common pipe 28. These nozzles 27 are arranged in a row crosswise of the ascending end section 10 of the belt and serve to direct strong sprays of steam against the end section 10 of the belt to sterilize it. Disposed adjacent the opposite end of the housing 5 are a plurality of nozzles 29 supplied with water from a common pipe 30. The nozzles 29 are arranged in a row extending in a direction crosswise of the descending end section 9 of the belt, in the portion between the rollers 12 and 15. These nozzles 29 are disposed in close proximity to the belt such as on the inside face thereof, and by discharging a strong stream or spray of water against the face of the belt immediately after it leaves roller 12, any solid particles of hops adhering to the outer face of the belt will be dislodged. Where the sprays are directed against the inside face of the belt, the liquid will pass through the belt and carry off any adhering solid hop particles. The housing 5 at the end having the roller 12, extends beyond the tank 1 so as to overhang it as shown in Fig. 1, and the overhanging part has an outlet 31 extending beneath a roller 13 and endwise away from the tank 1 substantially beyond the roller 12 in a horizontal direction so that the hop particles carried on the upper stretch 7 of the belt and which fall off by gravity as the belt passes around the roller 12 will fall through the opening 31. Similarly the particles dislodged by the liquid sprayed from nozzles 29, will also fall through this opening 31. The opening 31 forms the top of the downwardly converging duct 32 which conveys spray liquid and solids removed from the belt downwardly into a grinder 33 in which the hop solids are ground for disposal.

Disposed above the upper stretch of the belt are a plurality of rows of spray nozzles 34 which are arranged in rows extending in directions transversely of the direction of travel of the belt, that is, in directions from side to side thereof, and directed to spray downwardly upon the upper surface of the upper stretch of the belt a sparging or washing liquid, such as water. The nozzles in each row may be referred to as a sparging station, and these stations are arranged at spaced intervals along the path of travel of the upper stretch of the belt. While three sparging stations are shown, the number may be increased or decreased as may be desired. All of the nozzles 34 are supplied with sparging liquid or water through a common supply pipe 35 controlled by valve 35a (Fig. 1). It should be noted that the upper stretch 7 of the belt is inclined downwardly to the left in Fig. 1 by a small angle such as about 1°, so that any tendency of the liquid to run along the upper surface of the belt will be counter to the travel of the belt and not in the same direction. This insures that all liquid reaching the belt passes through it.

Disposed over the belt, but within the housing 5, is an inclined plate 36 which, at its lowermost end, is somewhat above the lower end of the upper stretch 7 of the belt 6. A conduit 37 opens into the upper part of the housing 5 in a direction to discharge a stream of cooked hops and wort into the housing 5, in a direction down the inclined plate 36. This plate 36 is provided with a plurality of small apertures or slots of very narrow width which serve to preliminarily strain some of the wort from the hop solids, but these slots are insufficient to carry off all of the wort, and consequently there would be sufficient wort remaining above plate 36 to wash the hops down the inclined plate and upon the lower end of the belt as shown by the arrow A in Fig. 1. A deflector plate 38 extending from close proximity to the upper stretch of belt 6, adjacent its lower end, to the end of the housing 5, serves to deflect upon the belt any liquid from the lower edge of plate 36 that would otherwise overshoot the belt. The wort or liquid which passes through the slots in the plate 36 is collected in a pan-like member 39 which is disposed below the plate, and this member 39, at its bottom wall, is inclined sidewise so as to direct the collected liquid through an aperture 40 in the housing 5.

The bottom wall of collecting member 39 extends beyond the aperture 40 to form a guide plate 41, see Fig. 3. Similarly the bottom wall 25 of the collecting member 24 which directs liquid collected from the belt through the opening 26, extends beyond the opening 26 to form a guide plate 42 at a level lower than guide plate 41. Movably secured to the side wall of the housing 5 in which the openings 26 and 40 are provided, is an auxiliary housing or cover 43. This cover or housing 43 has a vertical wall 45 extending parallel to, but spaced from a side wall of the housing 5, upwardly from the top plate 4 of the tank 1. This vertical wall carries a plurality of superposed, but spaced apart, inclined plates 46 in one group. These plates 46 extend between end vertical walls 47 of this auxiliary housing 43 and to the vertical wall 45, so as to form a plurality of sedimentation chambers 48 (see Fig. 3). These plates 46 become progressively wider, in a downward direction, so that their upper or free edges will together lie in a common inclined plane at approximately 90° to the planes of the plates 46 as shown in Fig. 3.

These chambers 48 are therefore in inclined positions having their openings or open faces in a plane which is crosswise of the stream of liquid delivered by the guide 41. The chambers 48 are arranged so that the liquid from the guide 41 will first enter the upper chamber 48 and then overflow over the edges of the plates 46 from chamber to chamber, and after overflowing from the lowermost chamber 48, will fall upon an inclined plate 49 which extends between the end walls 47 of the auxiliary housing 43. This plate 49, at its lower end, is spaced from the wall 45 to form a passage 50 which conducts the overflow from the lowermost chamber 48 through an opening 51 in the upper wall or cover 4 of the tank, into the tank. Similarly the vertical section of the plate 49 carries inclined plates 53 which are similar to the plates 46 and which also extend between the end walls 47 to form a plurality of inclined separation or sedimentation chambers 53. The guide 42 guides wort collected in member 24 into the upper chamber 53, and then the wort overflows the edges of plates 47 progressively so as to flow or cascade from chamber to chamber. From lowermost chamber 53 the wort overflows and falls through opening 51 into tank 1. The sedimentation chambers 48 and 53 serve to remove a large percentage of the trub, and after a run of hops and wort, the auxiliary housing 43 is opened and the sediment removed from the chambers 48 and 53.

The tank 1 has a plurality of manholes 54 arranged along one side, through which, when they are opened, one may insert brushes and brush every part of tank 1 without a person entering the tank. The sloping bottom of tank 1 enables full drainage of liquid, and hence there will be no stale liquid remaining in the tank. A drain pipe 55 leads from drain opening 3 to a wort pump, not shown. The housing 5 has removable plate sections (not shown) in its side wall opposite housing 43, and in its end walls, through which access may be had to the interior of the housing 5 to clean the various parts and for servicing.

It is believed that the operation will be clear from the foregoing description, but will be briefly reviewed. The cooked hops and wort from the cooking kettle (not shown) are delivered through conduit 37 to the upper part of housing 5 as a stream moving down inclined, apertured plate 36. Some of the wort passes through small apertures in plate 36, is collected in member 39 and delivered sidewise thereof through opening 40 and guide 41 into top sedimentation chamber 48. It overflows from chamber to chamber and then falls through opening 51 into tank 1. The remaining wort and hops are moved by gravity from the lower end of plate 36 upon the lower end portion of the moving belt 6 and carried slowly up the slight incline with the upper stretch of belt 6. The remaining wort passes through the sieve-like belt and is collected in member 24. The hops remaining on the belt pass beneath the wash sprays from nozzles 34 in successive sparging stations and the wash liquid carries adhering wort with it into member 24. The liquid collecting in member 24 will be delivered sidewise of housing 5 into the uppermost sedimentation chamber 53 and overflow progressively from chamber to chamber and pass into tank 1. Much of the trub or very fine solids will settle out in chambers 48 and 53.

The hops in reaching the rear or upper end of the upper stretch of the belt will fall off, by gravity, as the belt moves around belt driving roller 12, and descend through opening 31 to the hop shredder 33. The descending end section 9 of the belt 6 will pass sprays from nozzles 29 that loosens any adhering hops and thus spray liquid also descends through opening 31. The lower stretch 8 of belt 6 will pass through the shallow pan 23 of hot water, the water moving continuously over the rear edge of the pan into opening 31. Fresh hot water is supplied continuously to pan 24. This soaking of the belt further loosens adhering hop solids and cleans the belt. The ascending end portion 10 of the belt passes a stream spray from nozzles 27 which sterilizes the belt just before more hops and wort are deposited on the belt. The belt is driven by roller 12, and this draws taut the upper stretch of the belt and allows the lower stretch to sag into pan 23.

It will be noted from the foregoing that the hot water in the pan 23 into which the lower reach or stretch 8 of the screen 6 sags, not only removes residual substances from the screen, but also conditions the screen to prevent evaporation thereof of the adherent liquid film. Any evaporation would concentrate any sugar present in adherent liquid as well as harden adhering organic solids, which would tend to close the openings in the screen and dog it. The screen 6 is kept well wetted throughout most, if not all of its travel, by the spray nozzles along the upper reach or stretch 7 and at both ends, and by the hot water bath through which the lower reach or stretch 8 travels.

The hot water in pan 23 is a solvent for sugar, and hence it keeps the sugar concentration of the adhesive liquor at a very low value, maintaining the screen open and non-sticky at all times. The apparatus is operated hot, and hence a thin liquid film adhering to the screen, even though diluted to wash liquor strength, would have a very substantial surface of exposure in proportion to the amount of the adhering liquor. This thin film would be expected to evaporate quite quickly to a stick consistency that would tend to close the screen openings. By keeping the screen well wetted continuously by sprays and the hot water bath, the formation of this sticky consistency film is substantially prevented. The screen is kept well wetted and clean, even when the spray water at the nozzles should be scanty, the sugar concentration in the pan 23 allowed to rise to an appreciable extent, and the cleansing action is not vigorous or thorough.

Throughout the specification and claims the word "trub" is intended to mean the finely divided solids that are found in suspension in the liquid in which the hops are cooked, including those which are formed during the cooking process. The terms clarifying and separating means for the wort are intended broadly to include any suitable means to remove the finely divided solids or trub, whether by a straining or strictly filter action or by decanting the liquid from sedimentation chambers, or from a cascade of sedimentation trays.

It will be understood that various changes in the details, materials and arrangements of parts, which have been herein described and illustrated in order to explain the nature of the invention, may be made by those skilled in the art within the principle and scope of the invention, as expressed in the appended claims.

I claim:

1. A self-cleaning hop strainer and trub separator which comprises an inclined reticulated plate, means for directing down the plate a stream of cooked hops and wort, a fine mesh, reticulated, endless belt having spaced apart, superposed stretches, with one end portion of the upper stretch disposed below the lower end of said plate in a position to receive therefrom the hops and some of the wort of said stream, said belt having end portions connecting the superposed stretches, a collecting member disposed beneath said plate, another collecting member disposed beneath said upper stretch of the belt for collecting wort passing through that stretch of the belt, a pair of trub separators, each separator having a series of sedimentation cells with its cells arranged at successively lower levels and each cell overflowing into the next lower cell until the lowest cell, one of said collecting members having an outlet discharging into the highest cell of the series of one separator, the other of said collecting members having an outlet discharging into the highest cell of the series of the other separator, means for collecting the overflow from the lowest cells of each series, means for spraying with water the spent hops on said upper stretch of said belt during its travel, means disposed below the discharge end of the upper stretch of said belt to receive the spent hops falling from said upper stretch as the belt then descends, a bath of hot water disposed below and through which the lower stretch of the belt travels, means at the descending end portion of the belt for delivering a forceful spray against the descending portion of the belt to dislodge any adhering hops, and means for directing a sterilizing medium against the ascending end portion of the belt.

2. A self-cleaning hop strainer and trub separator which comprises an inclined, apertured plate, an endless, flexible, reticulated belt with superposed, spaced stretches connected by end sections disposed with one end of the upper stretch below the lower end of said plate in a position to receive any discharge from the lower end of said plate, a collecting member disposed beneath said plate to collect liquid passing therethrough and having a discharge passage, a sedimentation chamber receiving liquid from said collecting member and disposed in the path of flow of liquid from said passage, another collecting member disposed beneath the upper stretch of said belt for collecting liquid passing through said upper stretch and having a discharge passage, another sedimentation chamber disposed to receive liquid collected by said another member and disposed in the path of flow of liquid from said second passage, means for spraying a sparge liquid on the hops on said upper stretch, means for moving said belt in a direction to carry the hops received on the upper stretch thereof for substantially the full length of said upper stretch and beneath the sparge spray, means below the delivery end of said upper stretch of belt for collecting the hops discharged from the upper stretch as the belt changes direction in moving to the lower stretch, means for dislodging adhering hops from the belt in the section passing from the discharge end of the upper stretch to its hop receiving position, and means for directing down said inclined plate a stream of cooked hops and wort.

3. A self-cleaning hop strainer and trub separator comprising a hollow housing, an inclined, reticulated plate in the upper part of the housing, an inlet for directing cooked hops and wort as a stream down said plate, an endless, flexible, sieve-like belt disposed in said housing and having superposed stretches connected by end sections, one end portion of the upper stretch being disposed below and in the path of flow of liquid from the lower end of said plate to receive hops and some wort from the lower end of said plate, means for moving said belt to carry the hops to the other end of the upper stretch and then downwardly, means for sparging the hops during such travel on said upper stretch, a collecting member beneath said plate to collect the wort passing through said plate and discharge it as a stream, another collecting member disposed under said upper stretch to collect the liquid passing through said belt and discharge it as a stream, sedimentation chambers disposed in the path of the discharged stream to receive the liquids collected by said members and remove the trub from the liquid wort, a spray device disposed at the inside face of the descending end section of the belt and delivering a forced spray through the belt from the inside out to loosen adhering hops on the opposite outside face of the belt, a hot liquid bath through which the lower stretch of the belt runs, and means at the ascending end section of the belt for spraying a sterilizing fluid upon the ascending belt.

4. A hop strainer and trub separator, comprising an endless, flexible, sieve-like belt, with superposed stretches connected by end sections, means for moving said belt lengthwise along said stretches in a closed looped path, means for delivering a stream of hops and wort upon the upper stretch of said belt adjacent the starting end thereof, means for sparging the hops on said upper stretch, a collecting member disposed beneath said upper stretch to collect the liquid passing therethrough and discharge it as a stream, a hot liquid bath in the path of travel of the lower stretch of said belt and through which the lower stretch of the belt passes, a spray disposed along the descending end section of the belt for directing a strong spray against the descending end section of the belt to loosen any adhering hops on the outside face of the belt, and a separator disposed in the path of said stream for receiving the stream of liquid from said member and removing trub therefrom.

5. A hop strainer and trub filter, comprising an endless, flexible, sieve-like belt with superposed stretches connected by end sections, means for moving said belt along said stretches in a closed looped path, means for delivering a stream of hops and wort upon the upper stretch of said belt adjacent the starting end thereof, means for sparging the hops on said upper stretch, a collecting member disposed beneath said upper stretch to collect the liquid passing therethrough and having a discharge outlet to discharge the liquid as a stream, a hot liquid bath through which the lower stretch of the belt passes, a spray disposed along the descending end section of the belt at the inside face thereof for directing a strong spray against the inside face of the belt to loosen any adhering hops on the opposite face, said member delivering the collected liquid as a stream, a plurality of upwardly opening sedimentation chambers below said outlet and disposed to receive said stream from said member, with the received liquid overflowing from chamber to chamber in succession and the trub remaining in said chambers.

6. The method of separating cooked hops and wort which comprises separating part of the liquid wort from the hops, depositing the hops and remainder of the wort upon a moving sieve-like surface, sparging and spreading the hops on said surface during its movement, collecting the liquid passing through said surface and passing it and said separated part of the liquid through sedimentation chambers in succession to remove the trub from the liquid.

7. A separator comprising a housing having vertical face and end walls, a plurality of plates disposed in superposed, vertically spaced relation, with groups of adjacent plates secured tightly edgewise against the same face wall and endwise against said end walls, and extending obliquely upwardly and away from said face wall to distances becoming progressively greater with the lower plates, to form a series of sedimentation chambers of depths becoming progressively deeper at the lower levels, whereby when liquid with suspended solids is discharged into the upper chamber, it will overflow from chamber to chamber over the free edges of the plates, leaving solids in the different chambers, and means for collecting the liquid overflowing from the lowermost chamber.

8. A separator of solids from suspending liquids which comprises an inclined, reticulated strainer plate, means for directing liquid with suspended solids down said plate, a moving strainer sieve disposed below the lower edge of said plate to receive and carry the liquid and solids discharged from the lower end of said plate, and pass the liquid, but retain thereon said solids, a collecting member beneath said plate to collect liquid passing through said plate, and directing it as a stream, another collecting member disposed beneath said moving strainer sieve to collect the liquid passing therethrough, and directing it as another stream, and a series of sedimentation chambers arranged at progressively different levels to receive in its uppermost chamber said first stream from said plate, with the liquid overflowing from chamber to chamber in the series, another similar series of chambers arranged to receive in its uppermost chamber said another stream, and a tank connected to receive the overflow from the lowermost chamber of each series.

9. A method of processing the product of hop cooking kettles to produce strained washed hops and a clarified wort which comprises separating a portion of the wort, clarifying said portion in a series of decanting stages to remove a substantial part of the trub therefrom, screening the cooked hops from the remaining wort, washing the cooked hops with water during the screening step, collecting the remaining wort and wash water as a combined liquor, clarifying said combined liquor in a series of decanting stages to remove a substantial part of the trub therefrom, and combining the clarified said first mentioned portion of the wort and the clarified said combined liquor as a final wort product.

10. The method as described by claim 9 further characterized by said screening being effected upon a maintained clean and sterile surface effected by continuously cleaning and sterilizing a portion of said surface at one station while screening at another station, and continuously advancing the surface from said first mentioned station to said last mentioned station.

11. A self-cleaning hop strainer and trub filter which comprises an inclined, apertured plate, means for discharging a stream of wort and suspended hops down said plate for separating some of the wort from the cooked hops and discharging the balance as a stream from the lower edge of the plate, a fine mesh, endless, apertured, flexible belt having superposed, spaced stretches connected by end stretches, and having one end portion of the upper stretch disposed in the path of said stream from said plate to receive the hops and remaining wort from said plate, means for moving said belt in a closed loop path, with the upper stretch moving upwardly at a small inclination and its lower end receiving said stream from said plate, means for sparging with a spray liquid the hops on said upper stretch to wash and spread the hops, wort clarifying means, means for collecting the wort passing through said apertured plate and discharging it into said clarifying means, another wort clarifying means, means for collecting the remaining wort and sparge liquid passing through said belt and directing it through said another clarifying means, a bath of liquid disposed beneath the lower stretch of said belt and into which the lower stretch sags as it moves from the discharge end of the upper stretch to the lower receiving end of the upper stretch.

12. A hop strainer and trub separator, which comprises an apertured inclined plate, a conduit for discharging a stream of cooked hops and wort upon the upper end of said plate, an endless flexible belt of fine apertures having superposed, spaced stretches connected by ascending and descending end stretches, means for moving said belt lengthwise, the end part of the upper stretch adjacent the ascending stretch being disposed below the lower end of said plate to receive the discharge therefrom, a collecting pan below said apertured plate to receive liquid passing through said plate and having a discharge opening, a collecting pan below said upper stretch to receive liquid passing through the upper stretch of said belt, and having a discharge passage, a spray device disposed along said upper stretch for discharging a sparge liquid upon the hops carried by said upper stretch of said belt, a hopper disposed below the descending stretch of said belt to collect the hops falling therefrom, a clarifying element into which is discharged the liquid and solids from the discharge opening of said collecting pan below said plate, another clarifying element into which is discharged the liquid and suspended solids from said passage from the pan below said upper stretch of the belt, and a receiver for collecting the separated liquid from said clarifying elements.

13. The method of separating wort and trub from their mixture in cooked hops, which comprises flushing the mixture down the upper face of an inclined reticulate surface to separate the part of the wort from the mixture which passes through said surface, separating the liquid from the larger solids in the remainder of the mixture which overruns said surface by a travelling screen, sparging the solids on said screen, discharging the solids from said screen after the sparging, cleaning said screen from adherent particles, after said discharge of said solids, with a fluid stream directed against the screen, then subjecting the screen to a bath of hot water to remove residual adherent but soluble solids tending to clog the screen, sterilizing the screen after its bath of hot water, then employing said screen to separate further wort and hops overrunning said plate, and clarifying the liquid passing through said surface and said screen to remove the suspended solids.

14. A hop strainer and trub separator, which comprises an apertured inclined plate, a conduit for discharging a stream of cooked hops and wort upon the upper end of said plate, an endless flexible belt of fine apertures having superposed, spaced stretches connected by ascending and descending end stretches, means for moving said belt lengthwise, the end part of the upper stretch adjacent the ascending stretch being disposed below the lower end of said plate to receive the discharge therefrom, a collecting pan below said apertured plate to receive liquid passing through said plate and having a discharge opening, a collecting pan below said upper stretch to receive liquid passing through the upper stretch of said belt, and having a discharge passage, a spray device disposed along said upper stretch for discharging a sparge liquid upon the hops carried by said upper stretch of said belt, a hopper disposed below the descending stretch of said belt to collect the hops falling therefrom, and clarifying means through which the liquid and solids from said collecting pans passes to separate the solids from the liquids.

CARL F. MITTMAN.

REFERENCES CITED

The following references are of record in the file of this patent:

UNITED STATES PATENTS

| Number | Name | Date |
|---|---|---|
| 614,498 | Prochazka | Nov. 22, 1898 |
| 1,018,166 | Coombs | Feb. 20, 1912 |
| 1,442,306 | Stonebraker | Jan. 16, 1923 |
| 1,545,210 | Stewart | July 7, 1925 |
| 1,789,425 | Cabrera | Jan. 20, 1931 |
| 1,793,449 | Bassler | Feb. 17, 1931 |
| 1,889,657 | Zademach | Feb. 28, 1933 |
| 1,956,833 | Raymond et al. | May 1, 1934 |
| 2,034,784 | Wallny | Mar. 24, 1936 |
| 2,097,529 | Nordell | Nov. 2, 1937 |
| 2,149,748 | Samuel | Mar. 7, 1939 |
| 2,230,386 | Pecker | Feb. 4, 1941 |
| 2,345,238 | Christensen | Mar. 28, 1944 |